June 9, 1931.　　　E. F. WILSON　　　1,808,874

WIND MOTOR

Filed Feb. 24, 1928

WITNESSES
Guy M Spring

Inventor
EARLE F. WILSON

By
Irving L. McCathran
Attorney

UNITED STATES PATENT OFFICE

EARLE F. WILSON, OF BAY LAKE, FLORIDA

WIND MOTOR

Application filed February 24, 1928. Serial No. 256,685.

This invention relates to the class of wind motors and pertains particularly to a motor especially designed for obtaining a maximum of power from the wind and transmitting the same directly to the structure to be operated without the interpositioning of wheels or gears or similar movement translating devices.

The invention broadly contemplates the provision upon a vertical shaft which may be mounted upon a building or high tower, of a series of radially extending substantially semi-circular blades, with substantially half of the series encased in a substantially semi-circular shield, a vane being carried upon the shield to maintain the cupped or concave faces of the blades toward the wind.

The invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claim.

Figure 1:
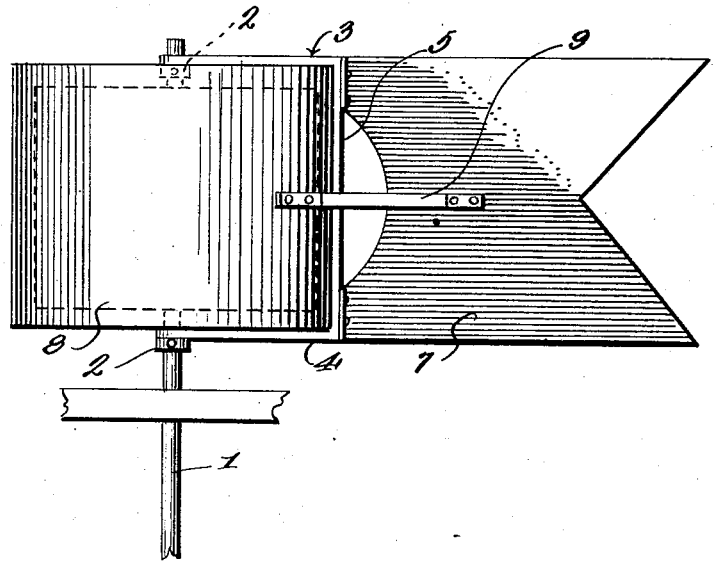
Figure 1 shows the wind motor structure embodying the present invention, in side elevation.

Referring now to the drawings in detail wherein like numerals of reference indicate corresponding parts throughout the several views, the numeral 1 indicates a vertical shaft which may be mounted in any desired manner to connect directly with the apparatus to which power is to be transmitted from the motor.

Adjacent the upper end of the shaft there is mounted thereon and secured thereto a pair of spaced collars 2 which support a frame indicated generally by the numeral 3, of substantially U-shaped configuration. The ends of the legs 4 of this frame are apertured to permit passage therethrough of the shaft 1 so that the frame is free to swing about the shaft upon the collars 2.

Figure 2:
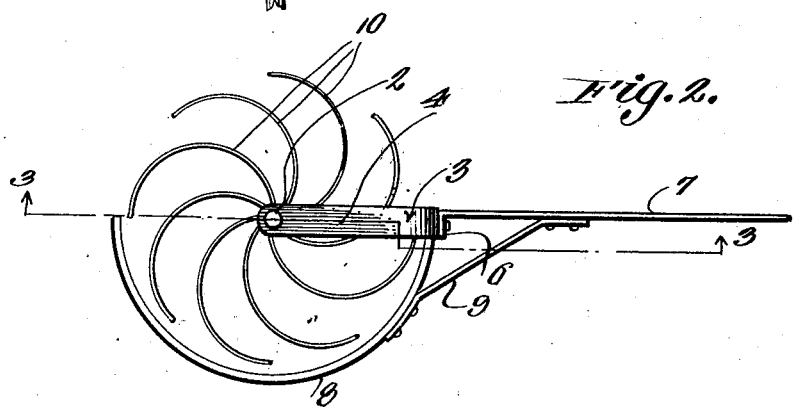
Figure 2 is a top plan view of the structure.
Figure 3:
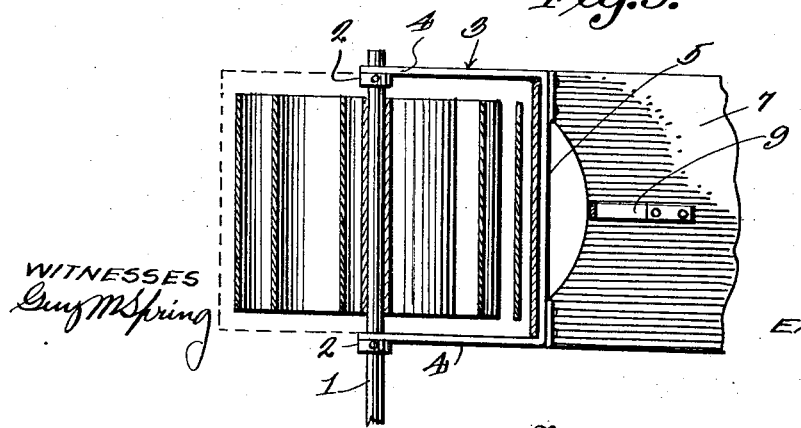
Figure 3 is a section taken upon the line 3—3 of Figure 2.

Upon the yoke portion 5 of the frame 3 there is secured by means of the integral brackets 6, a vane board 7, this board having its faces substantially parallel with the shaft 1 as shown in Figure 2.

Secured in the frame 3 in the yoke portion 5 is one end of a substantially semi-circular shield 8, this shield being held in concentric relation to the shaft 1 as shown. A suitable brace 9 connects the central portion of the vane board 7 with the body of the shield 8 to further strengthen the structure.

Mounted upon the shaft 1 between the collars 2 is a circular series of substantially semi-cylindrical wind blades 10, these blades being arranged in open nested relation about the shaft with those blades which have their concave faces directed away from the vane board lying outside of the shield 8.

From the foregoing description it will be seen that any current of air in which the wind motor might be placed, will act upon the vane board to cause the motor structure to swing about and carry with it the shield 8, until the concave surfaces of the exposed blades 10 are uncovered to receive the direct force of the wind.

With a motor of this character the blades which are moving toward the wind have no wind resistance to overcome as they are protected by the shield 8. But, as soon as each blade leaves the protection of the shield 8 it will be in a position to receive the full force of the wind in the concave face thereof. In this manner with no wind resistance to overcome in bringing the idling blades back to working position, this motor is designed to obtain a greater amount of power than is obtained at the present time with wind motors of a similar character.

Having thus described my invention what I claim is:

A wind motor comprising a vertical shaft, a wind wheel secured to said shaft, a U-shaped frame extending radially from said shaft including upper and lower arms and a connecting bight portion, the arms receiving the wind wheel therebetween and being provided with aligned bearings receiving said shaft, a semi-circular protecting housing for said wheel having one end rigidly secured to the inner face of the bight portion of the U-shaped frame and encasing substantially half of the wheel, and a wind vane having right angularly extending attaching feet rigidly secured to the outer face of the bight portion of said U-shaped frame.

In testimony whereof I affix my signature.

EARLE F. WILSON.